United States Patent [19]
Herring

[11] Patent Number: 5,560,137
[45] Date of Patent: Oct. 1, 1996

[54] ENVIRONMENT-ADAPTABLE HANDS-FREE FISHING ROD HOLDER ASSEMBLY

[76] Inventor: Henry B. Herring, 8513 W. Main, Mapleton, Ill. 61547

[21] Appl. No.: 251,407

[22] Filed: May 13, 1994

[51] Int. Cl.$^6$ .................................................. A01K 97/10
[52] U.S. Cl. ........................................ 43/21.2; 248/514
[58] Field of Search ....................... 43/21.2, 15, 22, 43/17.1, 17; 248/514, 515, 518, 520, 530, 534, 535

[56] References Cited

U.S. PATENT DOCUMENTS

| | | | |
|---|---|---|---|
| 2,704,412 | 3/1955 | Davis | 43/21.2 |
| 3,259,346 | 7/1966 | Rogers | 43/21.2 |
| 3,290,816 | 12/1966 | Eklof | 43/21.2 |
| 3,560,969 | 2/1971 | Fleeman | 43/21.2 |
| 4,551,939 | 11/1985 | Kitchens | 43/21.2 |
| 4,676,019 | 6/1987 | Engles | 43/21.2 |
| 4,763,435 | 8/1988 | Deering | 43/21.2 |
| 4,803,794 | 2/1989 | Lopez | 43/21.2 |
| 4,827,654 | 5/1989 | Roberts | 43/21.2 |
| 5,325,620 | 7/1994 | Reed et al. | 43/21.2 |

FOREIGN PATENT DOCUMENTS 2269518  2/1994  United Kingdom ................. 43/21.2

Primary Examiner—Chuck Y. Mah
Attorney, Agent, or Firm—John D. Gugliotta

[57] ABSTRACT

A fishing rod holder assembly includes a hands-free, partially cylindrical, elongated rod holder detachably affixed to adaptable support means for wheelchairs and other support structures typically available to physically challenged persons. A rod holder supplements a cradle support with an integral rotating locking ring and dual fishing rod trigger locking for added stability and easy operation. A wheelchair rail clamp provides a rotating, spring-loaded and non-removable rail locking means. Other self-contained and compactable clamping means provide similar adaptability and ease of use. In its preferred embodiment, a pressure fit interlocking means is used to accommodate potentially limited user dexterity and non-technical aides. Extensions and interchangeable support and clamping means provide for easily and securingly affixing fishing rods to decks, ground, posts and other structures in areas with limited access to mobility allowing devices. Lightweight, rigid plastic, hollow tubing are also preferred for accommodating users with limited lifting capability.

13 Claims, 4 Drawing Sheets

ENVIRONMENT-ADAPTABLE HANDS-FREE FISHING ROD HOLDER ASSEMBLY

BACKGROUND OF THE INVENTION

1. Field of Invention

This invention relates generally to fishing rod holders, and more particularly, to a fishing rod holder system designed primarily to meet the special needs of temporarily or permanently physically changed persons for a holder system that is adaptable to available environmental support structures.

2. Description of Prior Art

The needs of physically challenged persons are complex, particularly with those whose challenges are sudden and unforeseen and of those persons providing support. Despite public efforts to alleviate more obvious inconveniences, a lack of understanding often renders such efforts insufficient. This is especially true where these inconveniences relate to recreational scenarios, such as fishing, as opposed to activities typically considered necessary.

Fishing rod holders are well known. Kammwand, U.S. Pat. No. 4,716,674, teaches a support cylinder affixed within a pre-fabricated bulkhead receiver for troll fishing. Engle, U.S. Pat. No. Des. 334,226 discloses a conventional, bolted clamp, floating cylinder design. Lummux, U.S. Pat. No. Des. 271,610, discloses a bolted-clamp, dual-cylinder design. Engblom, U.S. Pat. No. Des. 246,661, discloses a bolted-border, open-cradle design.

Each invention, while significant in its targeted application, fails to address, let alone solve, the needs of the physically challenged. Each requires that the same support structure is always present, that a proper holder-receiving device has already been affixed to the support structure and/or that the holder means is permanently attached to a holder receiving device. Since each targets a specific support structure, adaptability to varying support structures, if existing at all, is severely limited. Transport and assembly requires special knowledge, tools, strength and dexterity. In addition, an inserted fishing rod is provided with no secondary, longitudinally extended support structure for preventing lateral or axial movement of an inserted fishing rod; such support must therefore be provided by an able user.

In reality, the available support structures often vary for many, if not most, users. A holder receiving cavity or affixing device is often unavailable. Users often lack the knowledge, tools, strength, dexterity and transport means needed to attach even an appropriate holder, should one happen to be feasible in that instance. Constant user support of a fishing rod against lateral or pivotal movement is not desirable even assuming that the user has the facilities to do so.

These prohibiting factors are further amplified when considered from the perspective of the physically challenged. Wheelchairs and other movement aiding devices, even if provided with a holder means, are often impractical or even dangerous to bring to and use at a fishing site. Therefore such persons are constantly confronted by considerably varying support structures. Attempts to transport, install and even use existing devices may well be exasperating if not prohibiting due to physical strength and dexterity limitations.

An adaptable holder system is therefore needed; one that provides for easy attaching and detaching of the holder to whatever environmental support structure is available. In addition, the holder must quickly and easily allow a fishing rod to be inserted into and removed from the holder. The holder must also support the rod securingly, in different orientations and in a hands-free manner. Again, such adjustments must be quickly and easily accomplished, particularly by those newly exposed to either fishing or simply to the rod holder system itself. Finally, the system must be sturdy yet light and compactable for transportation.

Thus there is a need for a fishing rod holder system that is light and portable, adaptable for attachment to varying available structures, that provides secure hands-free support of a fishing rod and yet is fast and easy to use for those with limited facility.

SUMMARY OF THE INVENTION

The present fishing rod holder assembly is intended specifically to provide a secure, essentially self-supporting fishing rod holder that is easily transported, configured and adaptable to the types of environments, situations and potential limitations confronting the physically challenged, care providers and others with similar requirements.

One object of the invention is that the assembly accommodate any number of available mounting structures where wheel chairs and other movement-aiding devices may or may not be accessible. Therefore, the assembly includes interchangeable clamps and extension rods for affixing a fishing rod holder to wheel chairs, planking, ground and posts, rails and other structures.

A second object of the invention is that the assembly accommodate users whose dexterity may be in some way limited. Therefore, the assembly clamps and fishing rod holder include easy to use, primarily non-detachable parts.

A third object of the invention is that the assembly accommodate users whose lifting ability may be limited and to accommodate easy transportation of needed adaptation means. Therefore, the assembly preferably provides a lightweight and easily connectable and separable tubular plastic construction.

A fourth object of the invention is thin the rod holder provide easy fishing rod securing and secure fishing rod support. Therefore a partially tubular rod holder cradle provides augmentations and a locking ring for more easily, yet securely receiving, affixing, detaching and removing a fishing rod.

These and other objects, advantages, features and benefits of the present invention will become apparent from the drawings and specification that follow.

DETAILED DESCRIPTION OF THE PREFERRED EMBODIMENT

Figure 1:
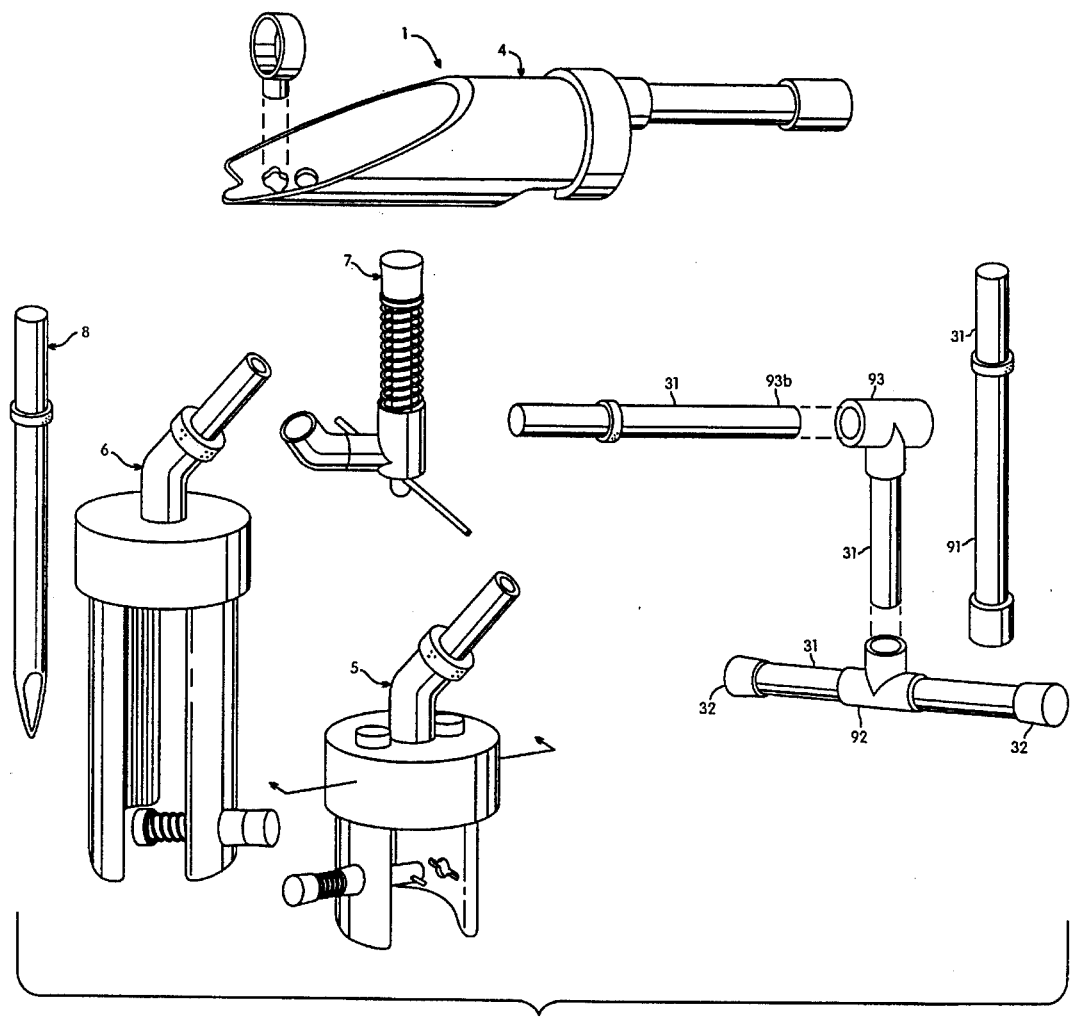
FIG. 1 is a perspective view of the preferred Environment-Adaptable, Hands-free Fishing Rod Holder Assembly, showing a functional distribution of the assembly elements.

FIG. 1 shows that the assembly 1 provides interchangeable members and a unique cradle-type fishing rod holder 4. The members are both easily identifiable and easily configureable for affixing the rod holder 4 to the environmental structures that are typically and often exclusively available at a fishing site with a variety of clamping means which are easily affixed, particularly by physically challenged persons, to the rod holder 4. A wheel chair clamp 5, a boat/dock clamp 6, a deck clamp 7 and a ground mooring 8 are removably affixed to the environmental structure. A T-shaped stabilizer foot 92 provides for triangle-design stability where needed. A straight extension 91 and a T-shaped extension 93 with a removable rod 93b provide added connection points and enhanced positioning of the rod holder 4.

Such functional divisions provide for maximizing the number of useable environmental structure types while at the same time requiring a minimum of lightweight, easily transportable and re-configureable members. Each member is easily recognizable, both in appearance and feel. The various clamp sizes and shapes are easily identified and associated with its particular usage. Other physical characteristics, such as the existence of end caps 32, and variations in the lengths of the shaft 32, add to such ease of use. As is detailed below, plastic tubing construction means little weight with extensive adjustability, durability and reliability. In addition, wherever feasible moving parts are permanently affixed to the respective members and all configurations are constructed and operable with a minimum of intuitive, simple and complimentary movements.

Figure 2:
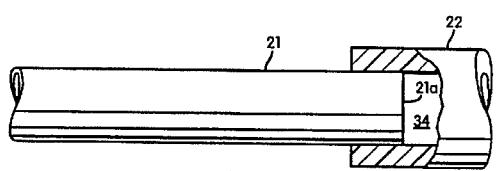
FIG. 2 is a partial cutaway view showing a first pressure fit locking means utilized for affixing interconnecting assembly elements.
Figure 3:
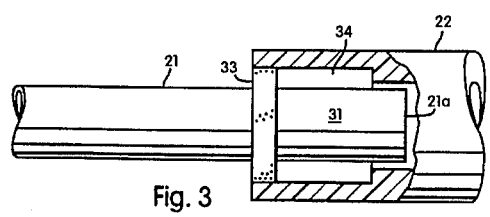
FIG. 3 is a partial cutaway view showing a second pressure fit locking means utilized for affixing interconnecting assembly elements.

FIGS. 2 and 3 show in detail various configurations formed in a typical manner with common interlocking features available at each of the various clamping means by inserting and thereby pressure fitting the end 21a of a first member 21 telescopingly into a cavity 34 formed at the end of a receiving member 22. Two variations are used. In the first variation matched end 21 a and receiving cavity 34 diameters alone provide a snug and reliable connection. In the second variation, a pressure ring 33 affixed to the first member 21 provides a proper securing diameter. The pressure ring 33 allows greater shaft 31 length insertion into the receiving cavity 34, thereby providing greater stability and its inclusion or exclusion additionally greater recognition of the various members.

Pressure fitting, while not the only reliable and easy to use method available, minimizes manufacturing costs and provides other distinct advantages. First, each member is quickly and easily affixed to and detached from a receiving member without the need for special tools, dexterity or experience. Second, pressure fit members are easily axially rotated or shifted telescopingly for quick and reliable adjustment. Third, the user is immediately and effectively alerted of incorrect connection points due to the inability to make the appropriate connection.

Figure 4:
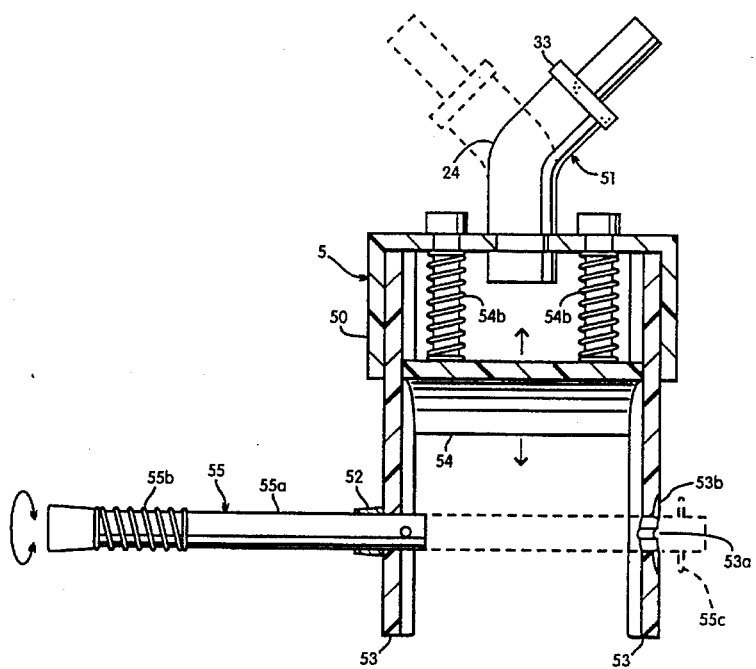
FIG. 4 is a partial cutaway view of the wheel chair clamp, showing how a sturdy, conforming support requires only a simple base pushing motion followed by a pin extend and twist motion; this operation is typical of each assembly clamp element.
Figure 5:
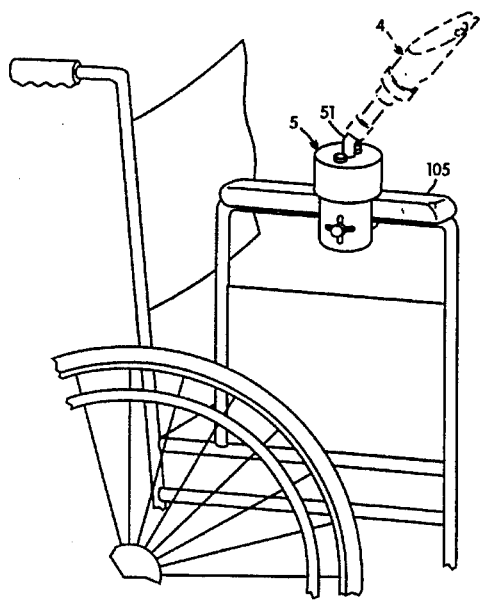
FIG. 5 shows how the wheel chair clamp is utilized as a support for the rod holder.

FIGS. 4 and 5 show how the wheel chair clamp 5 comprises an easily manipulated first base portion 50 from which other elements extend. As oriented in the figures, a rod holder receiving extension 51 extends upward and a rail clamp 52 extends downward from the first base portion 50. The rod holder receiving extension 51 is angled, rotates axially within the first base portion 50 and includes a pressure ring 33 (as described by FIG. 3) near a point of inflection 24. This provides an appropriate angle and direction for longitudinally directing a fishing rod 104 and a more secure connection to a rod holder 4. The rail clamp 52 provides side members 53, a spring-loaded, vertical locking block 54 and a slidable horizontal locking pin 55, with no detachable parts.

Figure 6:
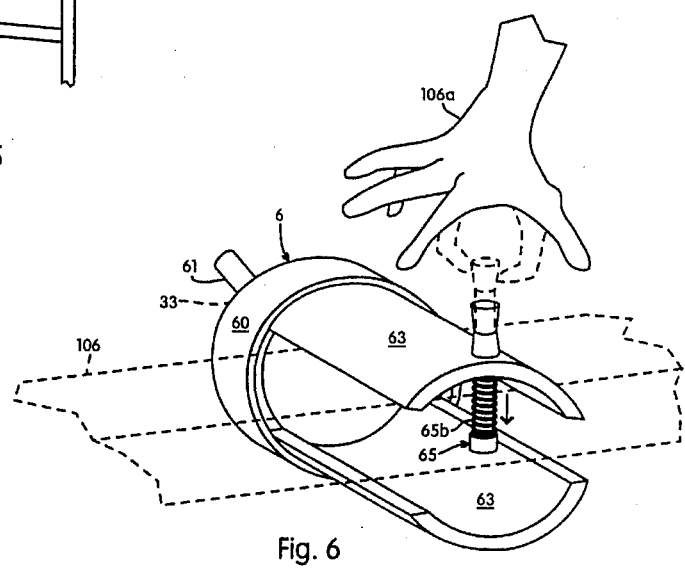
FIG. 6 is a perspective view of the boat/dock clamp, showing how its utility and operation are easy to use in a manner consistent with the wheel chair clamp but in a simplified form.

Operationally, the side members 53 are slipped over the top of a wheel chair rail 105 such that the side members 53 abut the sides of the rail 105. This downward motion is continued, compressing the locking block 54 and a plurality of locking block springs 54b upward toward the first base portion 50. The locking pin 55 is pushed inward, under the rail 105 and through a locking hole 53a formed in an opposing side member 53. The locking pin 55 is then rotated such that a T-shaped pin extension 55c is drawn into a locking depression 55b in the outer surface of the side member 53 by a recoiling spring 55b affixed to the shaft of the pin 55. These essentially two movements are intuitive, consistent with the operation of other members, require no extensive facility and yet provide secure support and flexible positioning. FIG. 6 shows that the boat/dock clamp 6 utilizes many features identical with the wheel chair clamp 5. While elongated for utilizing vertical and horizontal rails, post, or boat wall supports 106, the boat/dock clamp 6 operates in a similar manner to the wheel chair clamp 5. An angled rod holder receiving extension 61 with an affixed pressure ring 33 extends in a first direction from a second base 60. Again, side members 63 extend from the second base 60 in the opposing direction, abutting the sides of an environmental structure, only this time adapted with a perpendicularly sliding locking pin 65 used to secure the clamp 6 in place. However, the recoiling of a spring 65b in this case forces the perpendicularly sliding locking pin 65 inward to a locking position in order to provide for both encircling and clamping against a support structure. The vertical locking block 54 of the wheel chair clamp 5 has also been removed as it can impede vertical post mounting. Further, a stationary rod receiving extension 61 is preferred over the rotating rod receiving extension 51 in order to prevent unintended rotation during horizontal mounting without adding a rotate-and-lock means.

Figure 7:
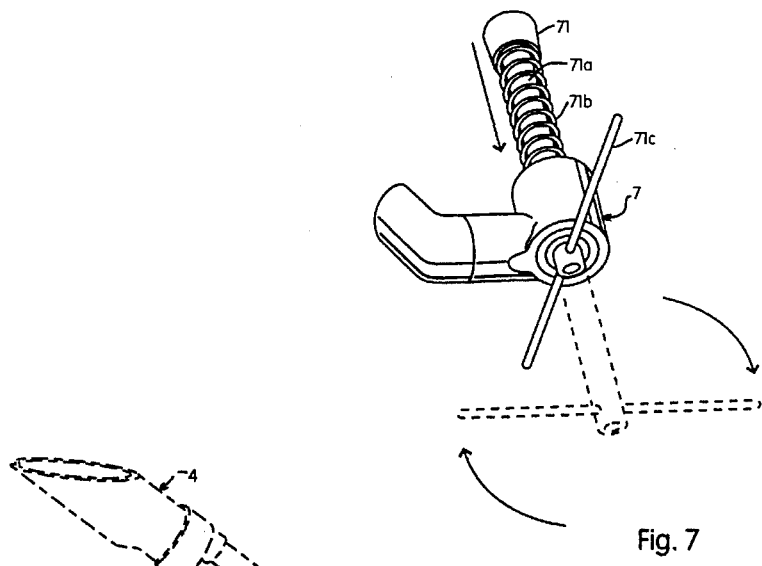
FIG. 7 is a perspective view of the deck clamp, showing again a consistent structure having a spring loaded, rotating T-shaped clamp.
Figure 8:
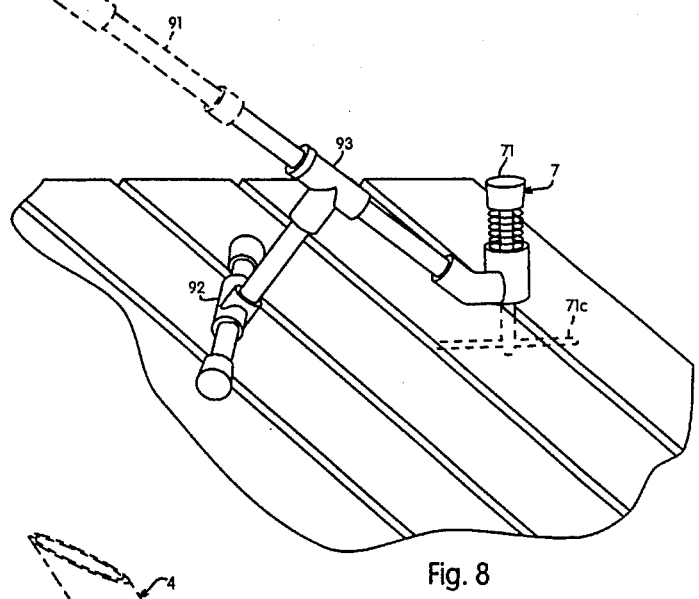
FIG. 8 is a perspective view as in FIG. 7 further showing the use of a T-shaped extension member and T-shaped base for tripod-like support of the fishing rod holder.

FIG. 7 shows how the deck clamp 7 is constructed and operates in a simple and intuitive manner consistent with those members described above. Extending downward from a larger third base 72 is a locking bar 71a; the bar 71a is encircled longitudinally by a tensioning spring 71b and ends in a T-shaped pin extension 71c. FIG. 8 shows how the narrow pin extension 71c is easily aligned between two deck planks 107 and then extended between the planks, thereby compressing the spring 71b. The third base 72 is the rotated and released, thereby rotating the pin extension 71c perpendicularly to the spacing of the planks 107 and locking the pin extension 71c due to the force of the recoiling tensioning spring 71b. In this case, a T-shaped mount extension 93 and a T-shaped stabilizer foot 92 are required for tripod-like lateral stabilization and rod holder 4 positioning. Further positioning of a rod holder 4 can be achieved, as needed, by simply inserting a straight extension 91 into the available receiving cavity.

Figure 9:
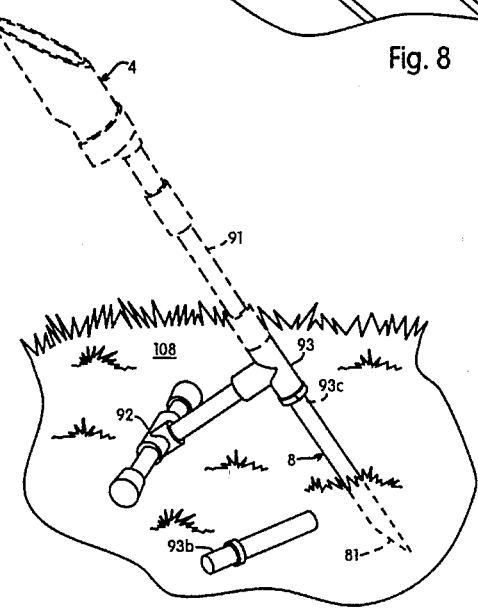
FIG. 9 is a perspective view of the ground mooring, showing the use of a T-shaped extension with a short straight extension removed and a T-shaped base for tripod-like support of the fishing rod holder.

FIG. 9 shows how a ground mooring 8 provides a rod holder support where the available environmental structure is soil, sand or a similar ground surface 108. As with the deck clamp 7, the lack of an existing raised structure precludes use of a clamp and thus requires a tripod-like footing. This structure is once again provided utilizing a unique element, the ground moaring 81, in conjunction with the T-shaped mount extension 93 and the T-shaped stabilizer foot 92.

Figure 10:
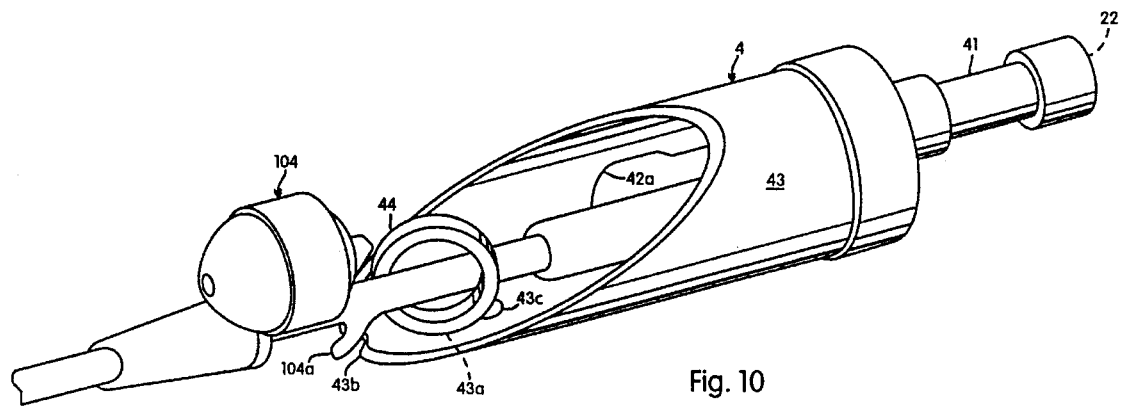
FIG. 10 is a top perspective view of the fishing rod holder, showing the use of a removable and rotatable locking ring for added support of single trigger fishing rods.
Figure 11:
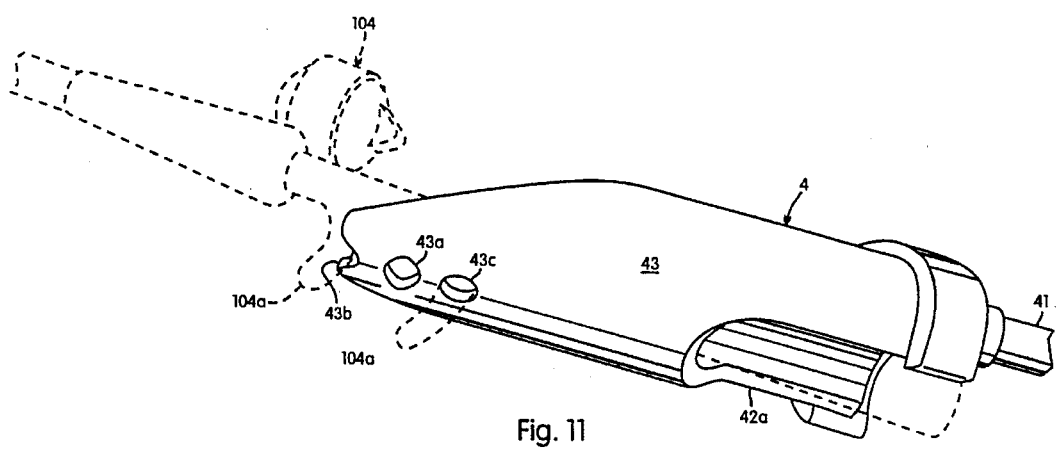
FIG. 11 is a bottom perspective view of the fishing rod holder, showing how the locking ring is removed and a trigger cutout provides for added support of a dual trigger fishing rod while a base cutout provides for necessary angling of a fishing rod during insertion and removal.

FIG. 10 and FIG. 11 show how the rod holder 4 provides for easy installation utilizing any of the support structures described above and once installed, provides for easy securing and removal of a fishing rod 104. The first member 21 of the rod holder 4 again simply pressure fits telescopingly into a receiving member 22 associated with any of the various provided clamp means.

The rod holder 4 provides for easy securing and removal of a variety of fishing rods. A rod holder cradle portion 43 has a handle cavity 42a cut from the support end and bottom of the cradle portion 43. A locking ring 44 is also provided and is rotatably supported by a locking hole 43a in the cradle portion 43 as a uniquely removable element. A trigger depression 43b and a trigger hole 43c are also provided. In this way, numerous fishing rod configurations such as those having trigger extensions 104a are supported at multiple points. Triggerless rods can extend the length of the cradle portion 43 and beyond, being supported by both the rod holder cradle portion 43 and the inserted locking ring 44. Single and double trigger rods can be angled upward for insertion into the trigger depression 43b and/or trigger hole 43c respectively; the locking ring 44 would thus not be needed.

While the above description contains many specificities, these should not be construed as limitations on the scope of the invention, but rather as an example of the preferred embodiment thereof. Many other variations are possible within the spirit and scope of the present invention.

For example, the properties of the preferred construction, interconnection and locking means can be achieved utilizing a variety of conventionally available materials and related methods. Lightweight yet durable conventional materials other than plastic can be used. Interlocking means other than the simplistic pressure fitting methods described can also offer ease of use, locking integrity and varying degrees of adjustability. The use of a receiving cavity molded to abut a member end and pressure ring at all points, for example, would improve stability, but would also reduce longitudinal adjustability. Other threaded, mating or vice means also offer varying degrees of useability, reliability and adjustability considered useable but less effective overall. However, any method selected must be used in a recognizably consistent manner as provided by the preferred embodiment.

A second example is that, while a mechanically simplistic structure is utilized for the various clamps, adaptability can be improved through conventional modifications. The wheel chair and/or boat/dock clamp side members can be springingly affixed to the base for utilizing environmental structures of varying diameters. A conventional locking pivot can also be added at the point of inflection of the rod receiving extension. A conventional locking rotation means can also be added to the boat/dock clamp rod receiving extension for allowing desired rotation while preempting unintentional rotation. These obvious adaptations are excluded from a preferred embodiment due to increased manufacturing costs and added complexity despite increased useability and adaptability.

A third example is that the specific appearance of the assembly, while preferably simple, can actually be used to enhance recognizability and thereby useability. Conventional methods such as color coding, numbering and/or augmentation of members and/or member ends is certainly contemplated by the invention.

There are, of course, other embodiments also within the spirit and scope of the present invention.

I claim:

1. An environment-adaptable, hands-free fishing rod holder assembly comprising the combination
    a cradle type fishing rod holder having a first end and a receiving member, said receiving member being generally tubular and forming a cavity, said first end fitting telescopingly into said cavity; and
    a plurality of alternately interlocking clamping means for securing said cradle type fishing rod holder in a removable fashion to various environmental structures, said plurality of clamping means each having a second end for fitting telescopingly into said cavity of said receiving member, said plurality of clamping means comprising the group consisting of:
    a. a wheel chair rail clamp, for attachment to the chair rail of a typical wheel chair,
    b. a boat/dock clamp, for attachment to a railing or support structure of a boat or dock,
    c. a ground mooring, for penetration into the ground,
    d. a deck clamp, for attachment between wooden decking planks, and
    e. a stabilizer foot, for providing additional support.

2. The fishing rod holder assembly as described in claim 1, wherein said cradle type fishing rod holder further comprises
    a generally tubular cradle portion having a handle cavity for receiving a handle of a fishing rod, a locking hole, a trigger depression for abutting a trigger structure of a fishing rod, and a trigger hole for alternately receiving a trigger structure of a fishing rod;
    a locking ring for surrounding and containing a fishing rod, said locking ring removably fitting into said locking hole; and
    connection means for connecting said first end to said cradle portion.

3. The fishing rod holder assembly as described in claim 1, wherein said wheel chair rail clamp comprises:
    a first support base;
    a pair of parallel side members defining a first side member and a second side member, mounted perpendicularly downward from said first support base;
    a rod holder receiving extension comprising said second end, said rod holder receiving extension mounted rotatingly on said first support base;

rail attachment means for locking said wheel chair rail clamp to the arm rail of a standard wheelchair; and clamp tensioning means for securing said wheel chair rail clamp when locked to the arm rail of a standard wheelchair in a secure and immobile condition.

4. The fishing rod holder assembly as described in claim 3, wherein said rod holder receiving extension extends perpendicularly from said first support base to a point of inflection and then further extends at an obtuse angle with respect to said support base, for providing more desirable and stable fishing rod positioning.

5. The fishing rod holder assembly as described in claim 3, wherein said rail attachment means comprises:

a horizontal locking pin mounted slidably and rotatably through said first side member, said horizontal locking pin having a locking end and a pressure end;

a recoil spring affixed to said pressure end between said pressure end and said first side member for providing increasing recoil tension when said horizontal locking pin is slid toward said first side member;

a tee-shaped pin extension mounted to said locking end of said horizontal locking pin;

a locking hole penetrating said second side member and having a locking depression for fittingly receiving said tee-shaped pin extension, said locking hole shaped for freely receiving said locking end when said horizontal locking pin is aligned with said locking hole while retaining said locking end when said locking pin is rotated beyond said align position.

6. The fishing rod holder assembly as described in claim 3, wherein said clamp tensioning means comprises:

a locking block slidably positioned between said parallel side members; and spring tensioning means mounted between said first support base and said locking block for providing increasing tension when said locking block is slid between said side members in the direction toward said first support base.

7. The fishing rod holder assembly as described in claim 6, wherein said rod holder receiving extension extends perpendicularly from said first support base to a point of inflection and then further extends at an obtuse angle with respect to said first support base, for providing more desirable and stable fishing rod positioning.

8. The fishing rod holder assembly as described in claim 1, wherein said boat/dock clamp comprises:

a second support base;

a pair of parallel side members defining a third side member and a fourth side member, mounted perpendicularly downward from said second base;

a fixed rod holder receiving extension comprising said second end, said fixed rod holder receiving extension mounted to said second support base; and dock/boat attachment means for locking said boat/dock clamp to either a vertical or a horizontal rail or post.

9. The fishing rod holder assembly as described in claim 8, wherein said boat/dock attachment means comprises: a perpendicularly sliding locking pin mounted slidably and rotatably through said third side member, said perpendicularly sliding locking pin having an engagement end for manually sliding said sliding, locking pin through said third side member and a contact end for securely contacting the rail of a dock or boat; and a spring affixed to said contact end between said contact end and said third side member for providing increasing recoil tension when said perpendicularly sliding locking pin is slid toward said third side member.

10. The fishing rod holder assembly as described in claim 1, wherein said ground mooring comprises an elongated sharpened spike having a spike end for penetration into the ground and an attachment end comprising said second end.

11. The fishing rod holder assembly as described in claim 1, wherein said deck clamp comprises:

a second rod holder receiving extension comprising said second end for fitting telescopingly into said cavity of said receiving member;

a locking bar mounted slidably and rotatably through said second rod holder receiving extension, said locking bar having a palm pressed end and a locking end;

a tensioning spring mounted around said locking bar between said palm pressed end and said second rod holder receiving extension for providing increasing recoil tension when said palm pressed end is slid toward said second rod holder receiving extension; and a narrow, elongated pin extension mounted perpendicularly at said locking end, for penetrating between adjacent deck boards of a dock environmental structure and retaining said deck clamp when said locking bar is rotated to engage said elongated pin extension against the back side of said deck boards of a dock environmental structure.

12. The fishing rod holder assembly as described in claim 1, wherein said stabilizer foot comprises the interchangeably configured combination of:

a tee-shaped stabilizer base having a horizontally elongated foot member and end caps, for forming a stabilized base portion, and a central, tee fitting for engaging with the other elements of said stabilizer foot;

a tee-shaped extension for connecting with said tee fitting and having a second tee fitting for further engaging with other elements of said stabilizer foot;

a straight extension having an additional receiving member, said additional receiving member forming a cavity; and a shaft comprising an additional second end for telescopingly fitting into said cavity.

13. The fishing rod holder assembly as described in claim 1, wherein said clamping means are interchangeably affixed to environmental support structures.

* * * * *